United States Patent
Bedingfield et al.

(10) Patent No.: US 6,236,675 B1
(45) Date of Patent: *May 22, 2001

(54) PILOT TONE SYSTEM AND METHOD TO ALLOW CONTINUOUS SYNCHRONIZATION IN MULTIPOINT NETWORKS

(75) Inventors: John Bedingfield; Charles G. Coston, both of Largo; Thomas J. Bingel, Belleair Beach; William L. Betts, St. Petersburg; Joseph Q. Chapman, Seminole, all of FL (US)

(73) Assignee: Paradyne Corporation, Largo, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/936,415

(22) Filed: Sep. 25, 1997

Related U.S. Application Data

(60) Provisional application No. 60/038,595, filed on Mar. 5, 1997.

(51) Int. Cl.⁷ .................. H04B 1/38; H04L 5/16

(52) U.S. Cl. .......................... 375/222; 375/356

(58) Field of Search ..................... 375/222, 219, 375/362, 356, 365, 367, 373, 364, 202, 270, 285, 357, 223, 259, 261, 231, 377, 321, 344, 350, 354, 371, 216, 340, 232, 376; 395/200.78, 200.38, 200.39, 200.4, 200.51, 200.52; 327/141, 162, 163; 379/93.31, 93.28, 93.26, 93.01, 90.01, 410, 406, 399, 93.32, 93.33; 370/276, 296, 503, 509, 510, 511, 523, 498, 527, 514, 515, 516, 520, 522, 525, 526, 286, 295, 508; 455/47, 72, 70, 68, 39, 491, 480, 265, 260, 557, 550, 73, 71, 203, 35.1, 3.1, 5.1, 6.1, 6.2, 6.3; 380/34, 33, 9; 364/578, 488, 489, 602, 801, 802; 348/6–13, 500, 526, 525

(56) References Cited

U.S. PATENT DOCUMENTS 3,718,767 * 2/1973 Ellis .................. 179/15 BM (List continued on next page.)

OTHER PUBLICATIONS

Munoz–Colman, Asynchronous Communication at 28.8K BPS, pp. 1–7, Dec. 1994.*

*Primary Examiner*—William Luther
(74) *Attorney, Agent, or Firm*—Thomas, Kayden, Horstemeyer & Risley

(57) ABSTRACT

An improvement to a half duplex multipoint communication environment wherein a pilot tone enables a control modem to maintain synchronization with a plurality of remote modems. By employing a VCXO in a remote modem, a low jitter timing pulse is generated thus allowing a control modem to maintain synchronization with a plurality of remote modems.

9 Claims, 6 Drawing Sheets

U.S. PATENT DOCUMENTS

| | | | | |
|---|---|---|---|---|
| 4,766,589 | * | 8/1988 | Fisher | 370/32 |
| 4,860,285 | * | 8/1989 | Miller et al. | 370/100 |
| 5,394,346 | * | 2/1995 | Milsom | 364/578 |
| 5,796,808 | * | 8/1998 | Scott et al. | 379/93.31 |
| 5,970,066 | * | 10/1999 | Lowry et al. . | |
| 6,052,380 | * | 4/2000 | Bell . | |

\* cited by examiner

PILOT TONE SYSTEM AND METHOD TO ALLOW CONTINUOUS SYNCHRONIZATION IN MULTIPOINT NETWORKS

CROSS REFERENCE TO RELATED APPLICATION

This document claims priority to and the benefit of the filing date of copending and commonly assigned provisional application entitled PILOT TONE FOR CO TO END POINT MODEM SYNC, assigned Ser. No. 60/038,595, and filed Mar. 5, 1997 and is hereby incorporated by reference.

FIELD OF THE INVENTION

The present invention relates generally to data communications, and more particularly, to a system and method for maintaining synchronization between a central office modem and a plurality of remote, or user, modems in a multipoint network topology.

BACKGROUND OF THE INVENTION

The field of data communications typically uses a device, such as a modem, to convey information from one location to another. Digital Subscriber Line (DSL) technology now enables devices to communicate rapidly large amounts of data. Modems communicate by modulating a baseband signal carrying digital data, converting the modulated digital data signal to an analog signal, and transmitting the analog signal over a conventional copper wire pair using techniques that are known in the art. These known techniques include mapping the information to be transmitted into a signal space constellation and differentially encoding the information to reduce errors and improve throughput. The constellation can include both analog and digital information or often merely digital information.

In the above mentioned communications system, typically both digital data and an analog signal are transmitted. The data signal to be transmitted is represented by a sequence of data symbols, where each data symbol is associated with a particular N-dimensional signal point value taken from a signal space. Similarly, the analog signal, which is represented by a voice signal, is processed so that it is mapped into the N-dimensional signal space to provide a voice signal point. This voice signal point defines the magnitude and angle of a voice signal vector about the origin of the signal space. The data symbol and the voice vector are then added together to select a resultant N-dimensional signal point. These N-dimensional signal points are grouped into signal space constellations and then transmitted to a far-end modem.

Upon reception of the transmitted N-dimensional signal point, the receiver of the far-end modem detects the embedded data symbol and subtracts the data symbol from the received N-dimensional signal point to yield the voice signal vector. This voice signal vector is then used to recreate the voice signal.

In the above mentioned communications environment, a control modem is located at a telephone company central office location. Connected to the control modem via a conventional copper wire pair are a plurality of remote modems. The remote modems reside at a common location, such as a residence or a business. The communication technique between the control modem and the remote modems is generally half duplex. In order to establish a communications connection between the central office modem and any of the remote modems, a lengthy preamble, which allows the modems to synchronize, at the start of each message is required. Existing techniques such as carrierless amplitude/phase modulation (CAP) and discrete multitone (DMT) modulation allow modems to transmit simultaneously between only two modems at a time. In a multipoint environment, greater circuit efficiency is possible because of the ability to connect multiple modems to the same communication channel.

In a 4 wire communications environment, the control modem can transmit continuously so that outbound preambles (from central office to remote location) are unnecessary, thus assuring remote modem synchronization. In a 2 wire multipoint environment, as contemplated by the present invention, when a remote modem transmits, it disrupts the outbound control signal from the control modem making it impossible for all remote modems connected to the communication line to maintain synchronization with the control modem. It is desirable to allow all remote modems to continuously maintain synchronization with the control modem in order to significantly reduce the training preamble necessary to establish a communication path between a remote modem and the control modem.

SUMMARY OF THE INVENTION

The present invention provides an improvement to a half duplex multipoint communication environment by enabling a control modem to continuously transmit a pilot tone, which can be simultaneously received by all remote modems on the communication line. By employing the present invention, all remote modems will maintain a continuous lock on the pilot tone from the control modem, thereby maintaining timing synchronization. By maintaining timing synchronization, special start up preamble signals are unnecessary during each poll sequence, thus significantly reducing the time required for communicating data.

The present invention provides a system for providing a pilot tone in a multipoint communication environment in a modem. The system includes a first modem, or control modem, having a pilot tone generator. The first modem also contains a transmitter for transmitting the pilot tone along a communications channel. The system further includes an additional modem, or remote modem, having a receiver for receiving the pilot tone and a decoder for decoding the pilot tone. The pilot tone remains active, and is received by the additional modem during a period when the additional modem is transmitting to the first modem. A plurality of additional modems can be connected to the communications line, all remaining in synchronization with the first modem.

The pilot tone is generated at a frequency that is outside of the normal communication bandwidth of the first modem and any additional modem, thereby allowing the additional modem to continuously receive the pilot tone, even while transmitting to the first modem.

The remote modems also include a voltage controlled crystal oscillator (VCXO) which allows the remote modems to transmit to the control modem using a time base that is locked to the frequency of the pilot tone, thereby eliminating the requirement that the control modem synchronize to each additional modem for each communication session. In this way, all remote modems can communicate to the control modem using the pilot tone time base, thereby eliminating the need for the control modem to lock to each remote modem. A pilot tone frequency that is exactly ½ the sampling rate of the modem is useful because it is outside the data bandwidth and allows all modems to easily reproduce exactly the same sample rate as the control modem.

The present invention also provides a method for communication in a modem, including the step of generating a pilot tone in the control modem. The control modem then transmits the pilot tone to all remote modems on the communications line. Each remote modem also includes a receiver for receiving the pilot tone and a decoder for decoding the pilot tone. In order to allow the control modem receiver to remain in synchronization with all remote modems, each remote modem contains logic designed to operate on the pilot tone in order to generate a low jitter clock signal, which is used to derive a sample rate signal used by the remote modem to transmit signals to the control modem. These transmit signals are thereby already synchronized to the control modem by the transmitted signals' phase alignment with the pilot tone, thus allowing the control modem receiver to maintain synchronization with the remote modem.

The invention has numerous advantages, a few of which are delineated hereafter, as merely examples.

An advantage of the present invention is that it minimizes connection time between a control modem and a remote modem by eliminating the need for a lengthy start up preamble.

Another advantage of the present invention is that it allows a control modem to continuously maintain synchronization with a plurality of remote modems.

Another advantage of the invention is that by employing a voltage controlled crystal oscillator (VCXO) in order to develop a low jitter clock signal in a receiver, it allows the control modem to maintain constant synchronization with a plurality of remote modems.

Another advantage of the present invention is that it is simple in design, reliable in operation, and its design lends itself to economical mass production in modems.

Other features and advantages of the present invention will become apparent to one with skill in the art upon examination of the following drawings and detailed description. It is intended that all such additional features and advantages be included herein within the scope of the present invention, as defined in the appended claims.

BRIEF DESCRIPTION OF THE DRAWINGS

The present invention, as defined in the claims, can be better understood with reference to the following drawings. The components within the drawings are not necessarily to scale relative to each another, emphasis instead being placed on clearly illustrating the principles of the present invention.

DETAILED DESCRIPTION OF THE PREFERRED EMBODIMENT

The present invention can be implemented in software, hardware, or a combination thereof. In the preferred embodiment, the elements of the present invention are implemented in software that is stored in a memory and that configures and drives a suitable digital signal processor (DSP) situated in a modem. However, the foregoing software can be stored on any computer-readable medium for transport or for use by or in connection with any suitable computer-related system or method. In the context of this document, a computer-readable medium is an electronic, magnetic, optical, or other physical device or means that can contain or store a computer program for use by or in connection with a computer-related system or method.

Figure 1:
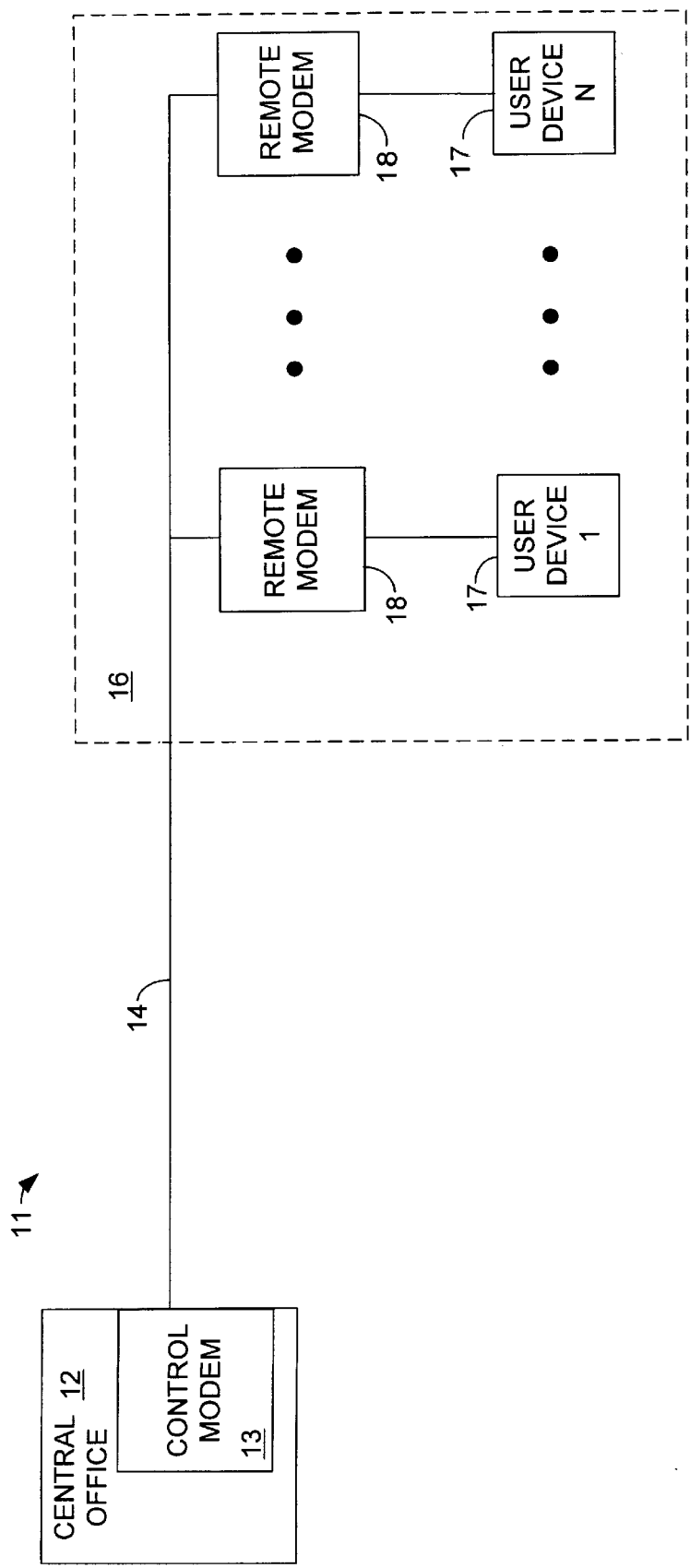
FIG. 1 is a schematic view illustrating a multipoint communications environment.

FIG. 1, shows a schematic view illustrating a multipoint communications environment 11 in which modems employing the concepts and features of the present invention are used. Remote location 16 is connected to central office location 12 via communications channel 14. Located at central office location 12 is control modem 13 Control modem 13 can also be a remote terminal. Channel 14 is typically the copper wire pair that extends between a telephone company central office and a remote residential, business, or any other location served by local telephone service. Remote location 16 may contain a plurality of remote modems 18 connecting a plurality of user devices 17 to communication channel 14. Remote location 16 can be a residential, business, or any other location served by conventional copper wire pair. By using modems 18 and modem 13 employing the concepts and features of the present invention, it is possible to transmit a pilot tone from control modem 13 to all remote modems 18 thereby allowing all remote modems 18 to maintain continuous synchronization with control modem 13, and enabling control modem 13 to maintain continuous synchronization with each of a plurality of remote modems 18.

Figure 2:
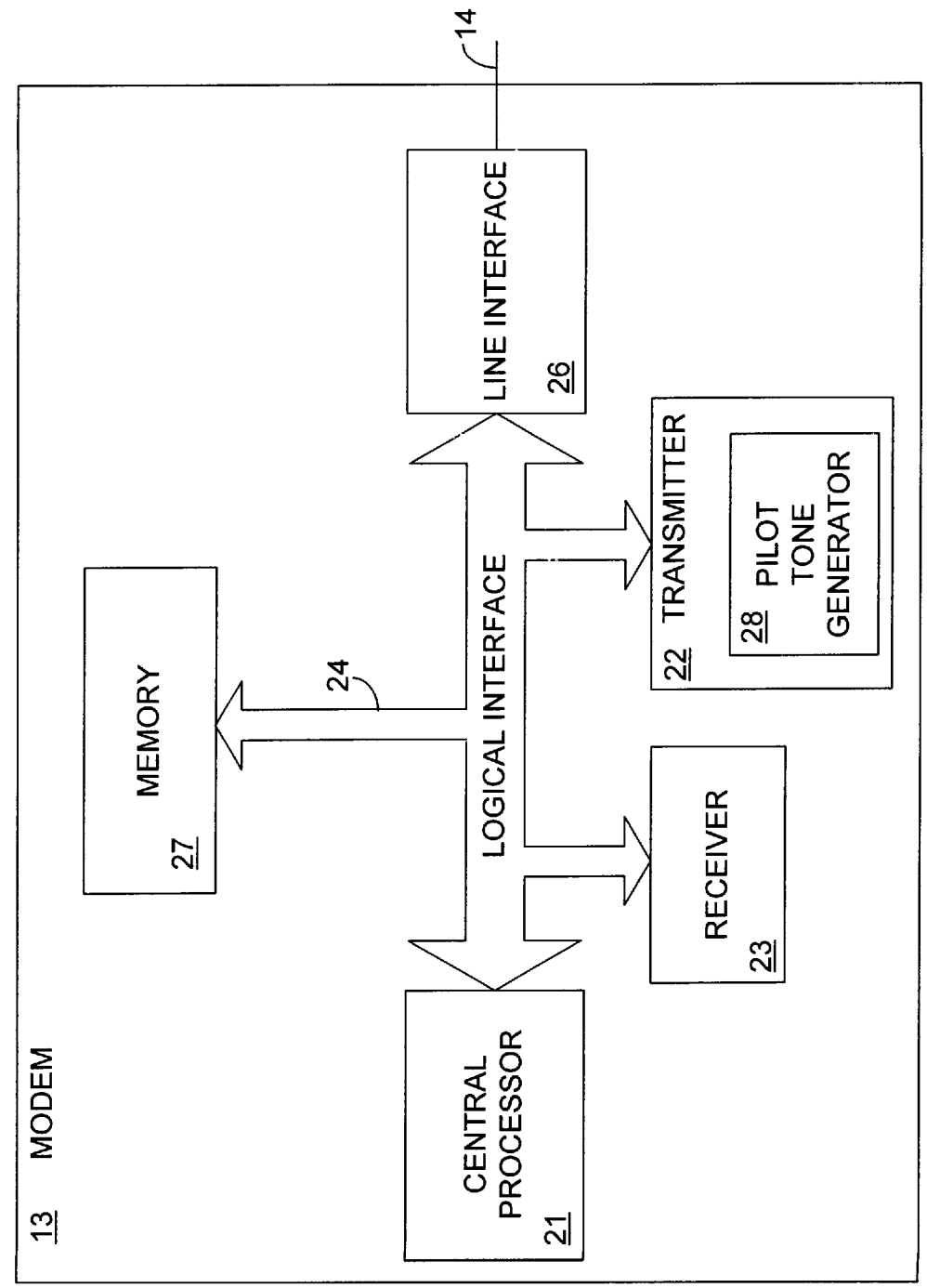
FIG. 2 is a schematic view illustrating a modem of FIG. 1 including the pilot tone generator of the present invention.

Now referring to FIG. 2, shown is a schematic view illustrating a control modem 13 of FIG. 1 including the concepts of the present invention. Elements of the present invention reside both in control modem 13 and remote modems 18. Specifically, control modem 13 contains transmitter 22 for transmitting to all remote modems 18 a pilot tone. Similarly, with respect to FIG. 3, all remote modems 18 contain receiver 23 for receiving the pilot tone sent by control modem 13.

Referring to FIGS. 1 and 2, the receiver 23 of control modem 13 is synchronized to its transmitter 22 and to its pilot tone generator 28. Furthermore, the sample rate of receiver 23 of remote modem 18 is synchronized to a multiple of the pilot tone frequency and transmitter 22 of remote modem 18 uses a sample rate synchronized to a multiple of the received pilot tone frequency.

Figure 3:
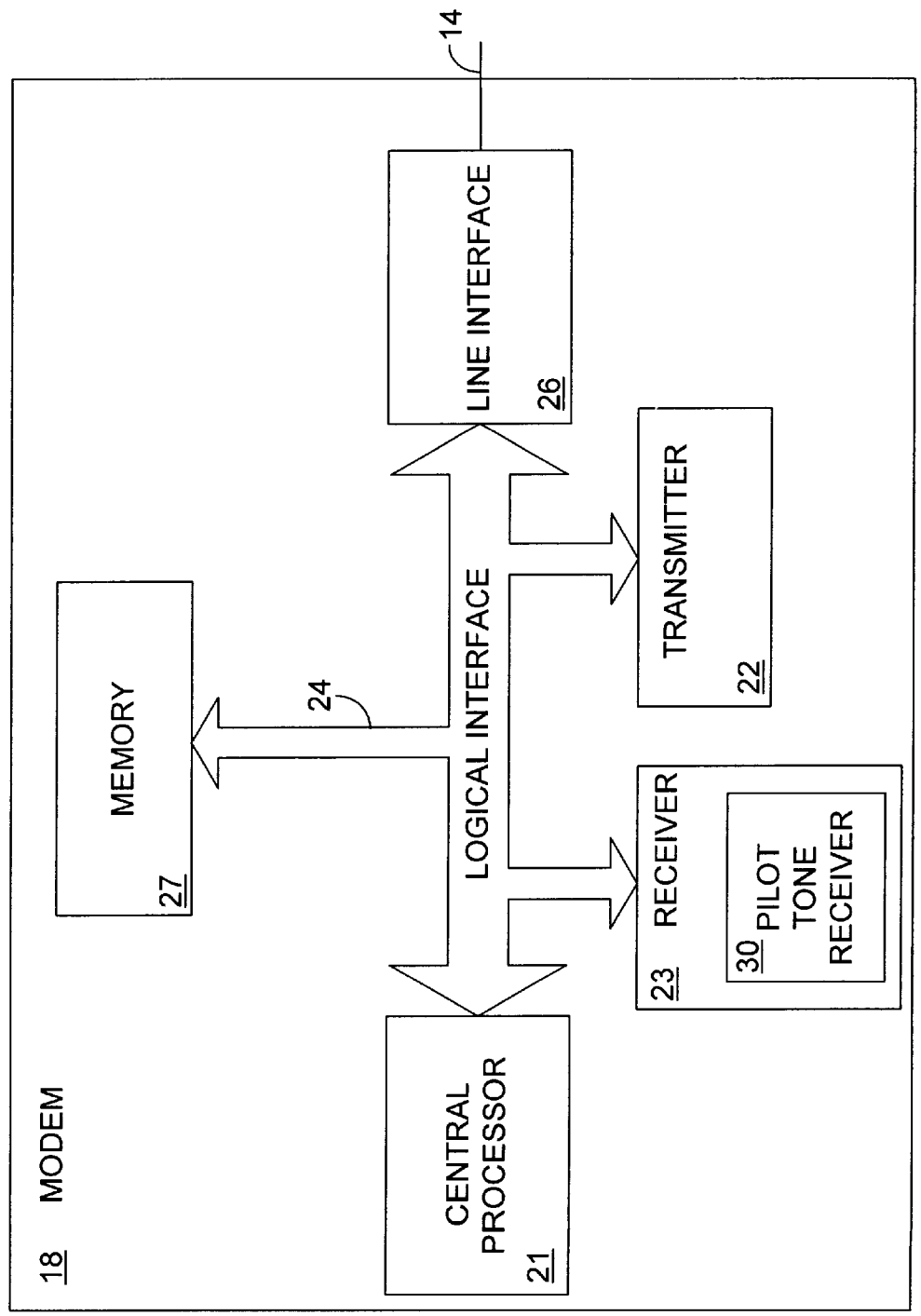
FIG. 3 is a schematic view illustrating a modem of FIG. 1 including the pilot tone receiver of the present invention.

Referring to both FIGS. 2 and 3, modems 13 and 18 contain conventional components as is known in the art of data communications. Central processor 21 controls the operation of the modems transmitter 22 and receiver 23 through logical interface 24, and couples to line interface 26 to gain access to communications channel 14. Also included in the transmitter section of control modem 13 is pilot tone generator 28, which enables control modem 13 to transmit the pilot tone of the present invention. Similarly, remote modem 18 contains receiver section 23, which contains pilot tone receiver 30.

Figure 4:
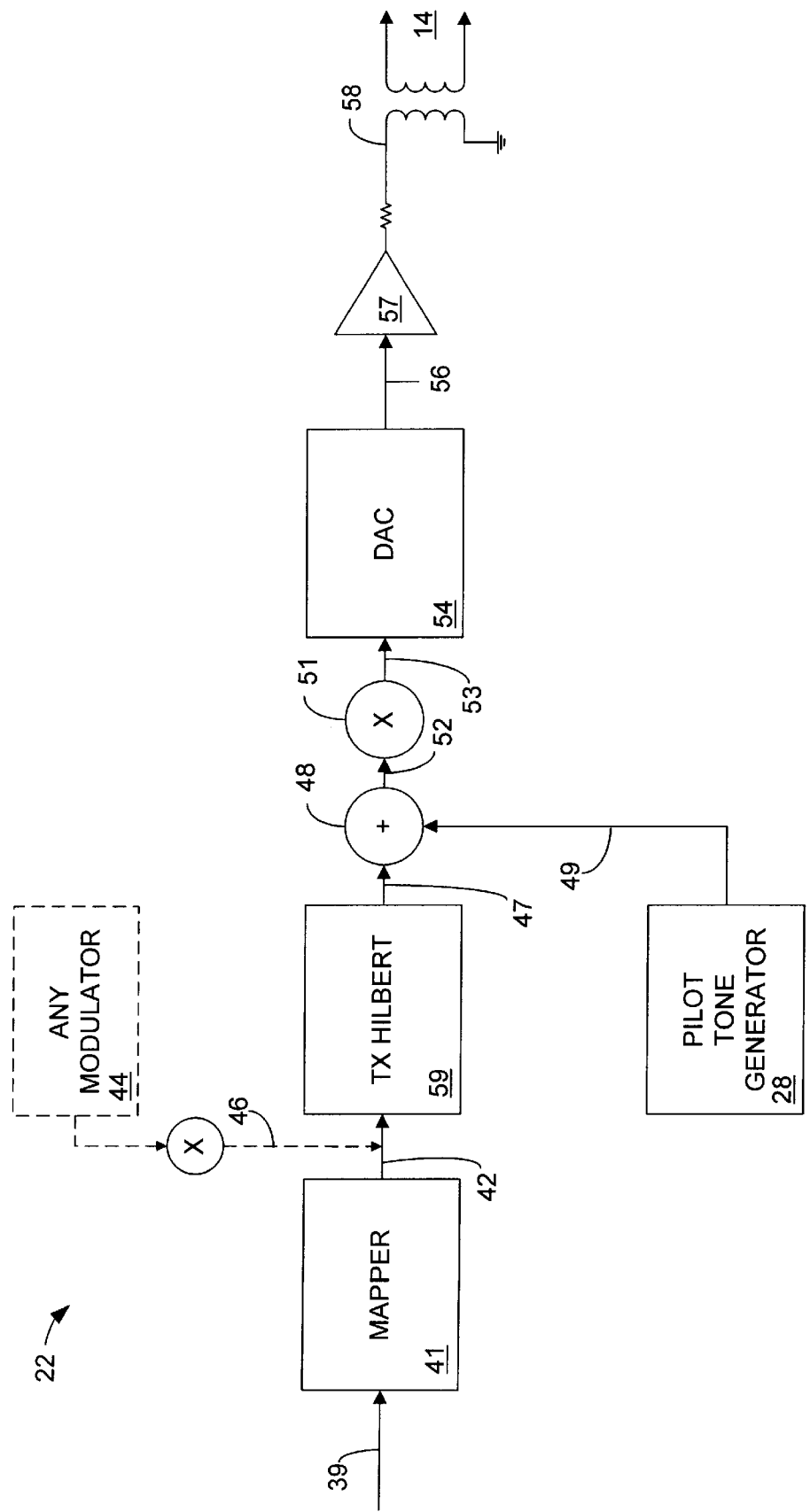
FIG. 4 is a schematic view illustrating a portion of a transmitter section of the modem of FIG. 2.

With reference now to FIG. 4, shown is a schematic view illustrating a portion of transmitter 22 of the modem of FIG. 2. Mapper 41 receives an input signal containing information to be transmitted on line 39 and maps that information into a signal space constellation as is known in the art. The mapped signal space constellation is supplied on line 42 to TX Hilbert filter 59 for carrierless amplitude/phase (CAP) modulation. In an alternative embodiment of the present invention, the mapped signal space constellation on line 42 is modulated, using modulator 44, using a technique such as quadrature amplitude modulation (QAM) as is known in the art. This modulated signal is then supplied as input to TX Hilbert filter 59. The modulated signal is then sent on line 47 to adder 48 where it is summed with a pilot tone on line 49 supplied by pilot tone generator 28. Pilot tone generator 28 supplies the pilot tone of the present invention. The pilot tone resides at a frequency that is slightly outside of the transmitter's bandwidth and will be discussed in detail hereafter. The combined modulated signal and pilot tone is then supplied on line 52 to amplifier 51 for amplification and power control. The amplified signal is then passed on line 53 to digital-to-analog converter 54 for conversion to the analog domain for transmission on communication channel 14.

Figure 5:
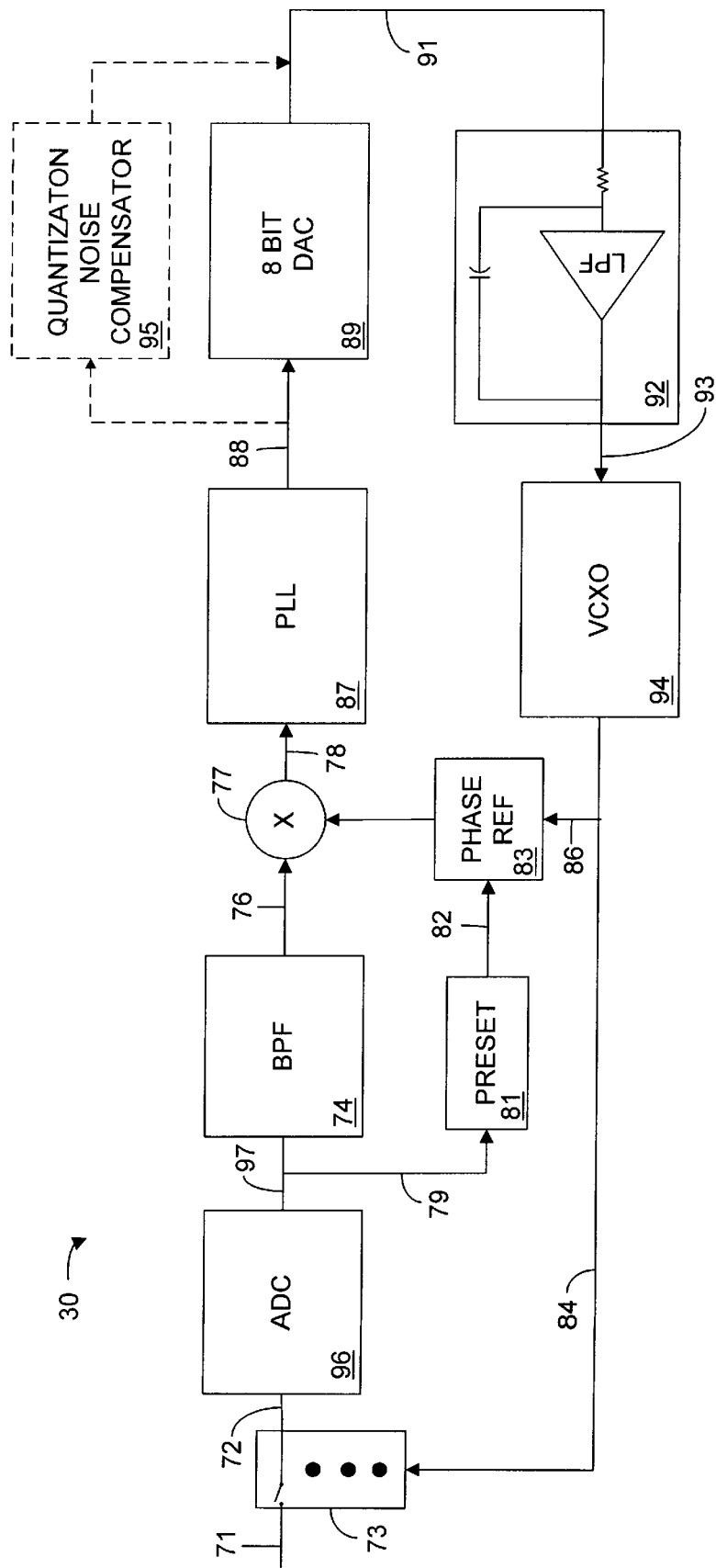
FIG. 5 is a schematic view illustrating a portion of a receiver section of the modem of FIG. 3.

FIG. 5 shows a schematic view illustrating a portion of receiver 23 illustrating pilot tone receiver 30 of the modem of FIG. 3. Specifically, a received signal including a pilot tone is received on line 71. Sampler 73 is driven by VCXO 94 and will be explained in detail below. This sampling is done at a multiple of the symbol rate of the modem. The sampled signal on line 72 is supplied to analog-to-digital converter 96 and then on line 97 to band pass filter (BPF) 74, which isolates the high frequency pilot tone. Band pass filter 74, in the preferred embodiment, is a digital high pass filter. The filtered signal is then supplied on line 76 to multiplier 77, which multiplies the filtered signal by phase reference 83. This signal is then averaged over one symbol period, or three samples, for the preferred embodiment. For initial acquisition, the phase reference 83 can be preset by preset device 81, which places a preset signal on line 82. As is known in the art, preset may be accomplished by a wide band edge detector or by spectrum analysis in order to improve the acquisition time of phase locked loop 87. The signal is then supplied on line 78 to phase locked loop 87, which scales and integrates the signal to determine any static frequency offset. The phase error and frequency offset are scaled and then added as is known in the art. The scaled and added output is then placed on line 88 for input to 8 bit digital-to-analog (D-A) converter 89 and then on line 91 to low pass filter (LPF) 92. In an alternative embodiment, quantization noise compensator 95 can be used in place of 8 bit D-A converter 89. Quantization noise compensator 95 allows VCXO 94 to operate with only one bit input, i.e., by supplying one bit representing two voltage levels to LPF 92, thus reducing system complexity and cost. The filtered analog signal is then supplied on line 93 to voltage controlled crystal oscillator (VCXO) 94, such as the VECTRON Technologies, Inc., V-series VCXO, which supplies a low jitter clock pulse. The low jitter clock pulse on line 84 is used to derive the sample rate signal for both transmit and receive processing and is used by the remote modem to transmit signals to the control modem. These transmit signals from remote modem 18 are thereby already synchronized to control modem 13 by the transmitted signals' phase alignment with the pilot tone, thus allowing control modem 13 to maintain synchronization with remote modems 18.

This clock signal is supplied on line 84 for input to both phase reference 83 and sampler 73. Sampler 73 is driven by this low jitter clock pulse. Thus, remote modem 18 transmissions back to control modem 13 are synchronized to control modem 13. Previous techniques involved dividing a high frequency crystal output down to a level that enables a clean transmitter clock signal that is slaved to the pilot tone. Unfortunately, this previous method places a large amount of jitter on the clock, resulting in a noisy signal. By eliminating the requirement that a clock frequency be much higher than the sample rate of the signal (necessary because the A to D of receiver 23 in remote modem 18 needs this stability), the method of the present invention, by employing a VCXO, significantly reduces the jitter on the clock pulse, thus improving performance.

Figure 6:
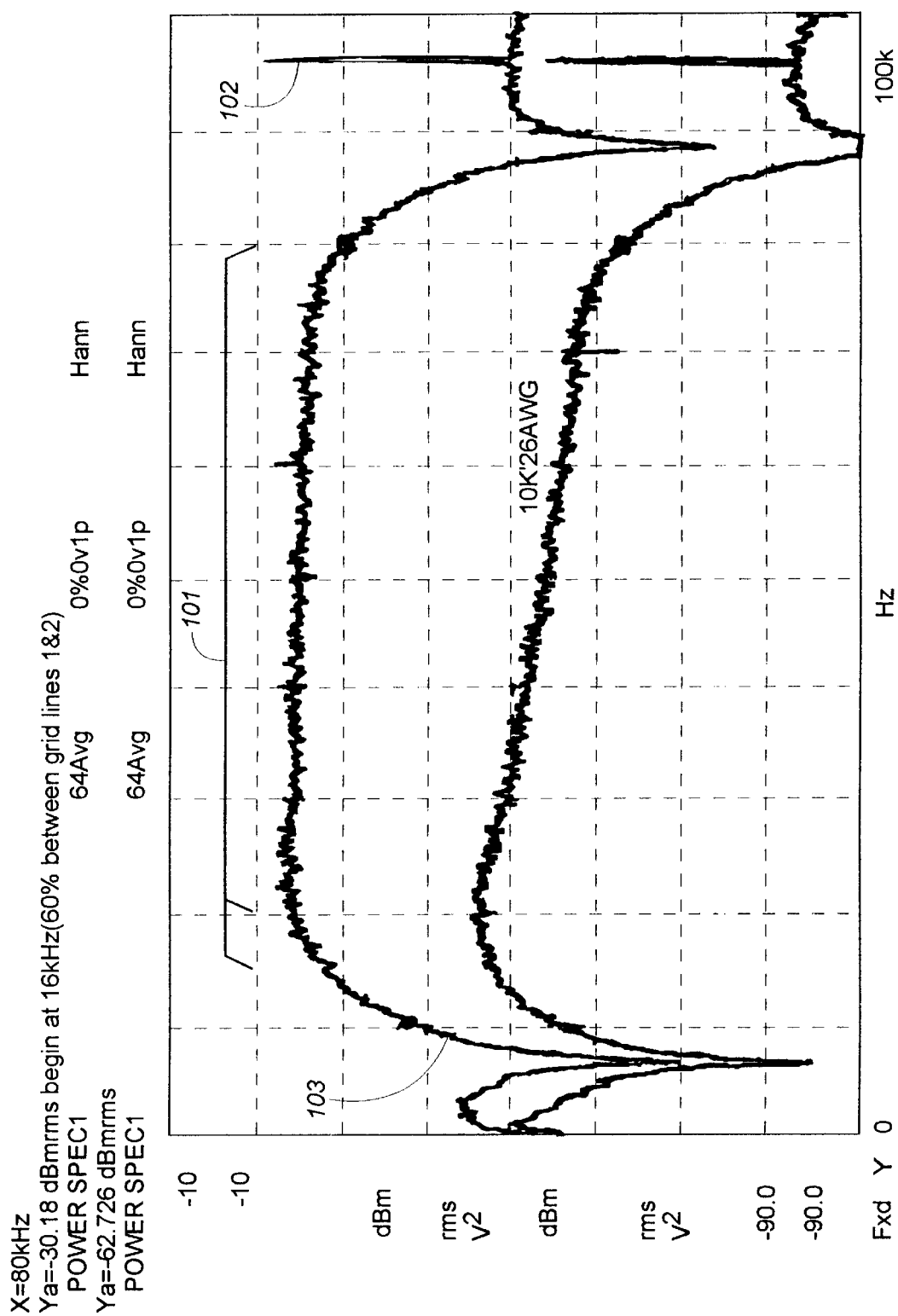
FIG. 6 is a graphical representation of the pilot tone signal of the present invention with respect to the frequency spectrum of the modem of FIG. 2.

Referring now to FIG. 6, shown is a graphical representation of the pilot tone signal of the present invention with respect to the frequency spectrum of the modem of FIG. 2. Section 101 of trace 103 depicts the 64 KHz transmit frequency spectrum of the preferred embodiment. As can be seen, pilot tone 102 resides, in the preferred embodiment, at approximately 96 KHz, which is one half of the 192 KHz sample rate of the modem, and well above the transmit and receive bandwidth of the modems of the present invention.

It will be obvious to those skilled in the art that many modifications and variations may be made to the preferred embodiments of the present invention, as set forth above, without departing substantially from the principles of the present invention. For example, changing the number of bits in the DAC to a single bit, discrete implementation of the VCXO, or increasing the VCXO frequency for oversampled analog-to-digital converters. Furthermore, BPF 74 could be a low pass, bandpass, or highpass filter depending on whether the pilot tone frequency is located below, near, or above the transmit frequency spectrum, which may be other than the 64 KHz disclosed in the preferred embodiment. All such modifications and variations are intended to be included herein within the scope of the present invention, as defined in the claims that follow.

Therefore, the following is claimed:

1. A system for providing a pilot tone in a single wire pair multipoint communication environment, comprising:

a first modem coupled to said single wire pair and having a pilot tone generator configured to generate said pilot tone, said first modem having a transmitter for transmitting information using a communication bandwidth, and for transmitting said pilot tone, outside of said communication bandwidth, on a communication line;

at least two additional modems each coupled to said single wire pair, and having a receiver for receiving said pilot tone and a decoder for decoding said pilot tone, said pilot tone remaining active during a period when each of said at least two additional modems is transmitting to said first modem, said at least two additional modems and said first modem communicating in an arrangement in which transmission occurs between said first modem and each of said at least two additional modems in one direction at a time; and a VCXO, wherein said VCXO allows each of said at least two additional modems to communicate with said first modem using a rate that is the same as the rate of said first modem, said rate achieved by using said pilot tone having a frequency that is directly proportional to said rate to generate a low jitter clock signal that is used to develop said rate in each of said at least two additional modems, said frequency being directly proportional to said rate allowing said pilot tone to exist in a substantially harmonic free region outside of said communication bandwidth, thereby maintaining continuous synchronization and eliminating a requirement that said first modem synchronize to each of said at least two additional modems for each communication session.

2. The system of claim 1, wherein said pilot tone is generated at a frequency that is outside of the normal communication bandwidth of said first modem and each of said at least two additional modems, thereby allowing each of said at least two additional modems to continuously receive said pilot tone, while each of said at least two additional modems is transmitting to said first modem.

3. The system of claim 1, wherein each of said at least two additional modems locks to said pilot tone.

4. A system for transmitting a pilot tone in a single wire pair multipoint half-duplex communication environment, comprising:

a first modem having a pilot tone generator configured to generate said pilot tone, said modem having a transmitter for transmitting said pilot tone on a single wire pair communication line, wherein said pilot tone is generated at a frequency that is outside of the normal communication bandwidth of said modem; and wherein a VCXO located in a receiver of at least two additional modems allows each of said at least two additional modems to communicate with said first modem using a rate that is the same as the rate of said first modem, said rate achieved by using said pilot tone having a frequency that is directly proportional to said rate to generate a low jitter clock signal that is used to develop said rate in each of said at least two additional modems, thereby maintaining continuous synchronization and eliminating a requirement that said first modem synchronize to each of said at least two additional modems for each communication session.

5. A system for receiving a pilot tone in a single wire pair multipoint communication environment, comprising:

at least two modems each having a receiver for receiving said pilot tone and a decoder for decoding said pilot tone, said pilot tone remaining active during a period when each of said at least two modems is transmitting to an additional modem, said pilot tone received by each of said at least two modems in a bandwidth that is outside of the normal communication bandwidth of said at least two modems, said at least two modems communicating in an arrangement in which transmission occurs between said at least two modems in one direction at a time; and a VCXO, wherein said VCXO allows each of said at least two modems to generate a low jitter clock signal that is used to develop a rate in each of said at least two modems, said rate achieved by using said pilot tone having a frequency that is directly proportional to said rate, said frequency being directly proportional to said rate allowing said pilot tone to exist in a substantially harmonic free region outside of said communication bandwidth, thereby maintaining continuous synchronization and eliminating a requirement that each of said at least two modems synchronize for each communication session.

6. A method of communication over a single wire pair, comprising the steps of:

generating a pilot tone in a first modem;

transmitting said pilot tone to at least two additional modems, at a bandwidth that is outside of the normal communication bandwidth of said first modem and said at least two additional modems;

receiving in each of said at least two additional modems said pilot tone;

decoding in each of said at least two additional modems said pilot tone, said at least two additional modems and said first modem communicating in an arrangement in which transmission occurs between said first modem and each of said at least two additional modems in one direction at a time; and operating on said pilot tone in each of said at least two additional modems with a VCXO, wherein said VCXO allows each of said at least two additional modems to communicate with said first modem using a rate that is the same as the rate of said first modem, said rate achieved by using said pilot tone having a frequency that is directly proportional to said rate to generate a low jitter clock signal that is used to develop said rate in each of said at least two additional modems, said frequency being directly proportional to said rate allowing said pilot tone to exist in a substantially harmonic free region outside of said communication bandwidth, thereby maintaining continuous synchronization and eliminating a requirement that said first modem synchronize to said at least two additional modems for each communication session.

7. The method of claim 6, further comprising the step of generating said pilot tone at a frequency that is outside of the normal communication bandwidth of said first modem and each of said at least two additional modems, thereby allowing each of said at least two additional modems to continuously receive said pilot tone, while transmitting to said first modem.

8. A method for transmitting a pilot tone in a single wire pair multipoint half-duplex communication environment, comprising the steps of:

generating said pilot tone in a first modem;

transmitting said pilot tone to at least two additional modems coupled to said single wire pair, wherein said pilot tone is generated at a frequency that is outside of the normal communication bandwidth of said modem; and wherein a VCXO located in a receiver of each of said at least two additional modems allows each of said at least two additional modems to communicate with said first modem using a rate that is the same as the rate of said first modem, said rate achieved by using said pilot tone having a frequency that is directly proportional to said rate to generate a low jitter clock signal that is used to develop said rate in each of said at least two additional modems, thereby maintaining continuous synchronization and eliminating a requirement that said first modem synchronize to each of said at least two additional modems for each communication session.

9. A method for receiving a pilot tone in a single wire pair multipoint communication environment, comprising the steps of:

receiving said pilot tone in at least two modems each coupled to said single wire pair, said pilot tone received by each of said at least two modems in a bandwidth that is outside of the normal communication bandwidth of said at least two modems, said at least two modems communicating in an arrangement in which transmission occurs between said at least two modems in one direction at a time;

decoding said pilot tone, said pilot tone remaining active during a period when each of said at least two modems is transmitting to an additional modem; and operating on said pilot tone with a VCXO, wherein said VCXO allows each of said at least two modems to generate a low jitter clock signal that is used to develop a rate in each of said at least two modems, said rate achieved by using said pilot tone having a frequency that is directly proportional to said rate, said frequency being directly proportional to said rate allowing said pilot tone to exist in a substantially harmonic free region outside of said communication bandwidth, thereby maintaining continuous synchronization and eliminating a requirement that each of said at least two modems synchronize to said additional modem for each communication session.

* * * * *